(12) United States Patent
Siecke

(10) Patent No.: US 7,387,203 B2
(45) Date of Patent: Jun. 17, 2008

(54) GROOVED BOARD PACKAGING AND BLANK THEREFOR

(75) Inventor: Michael Alan Siecke, Glendale, CA (US)

(73) Assignee: Time Warner, Inc., New York, NY (US)

( * ) Notice: Subject to any disclaimer, the term of this patent is extended or adjusted under 35 U.S.C. 154(b) by 251 days.

(21) Appl. No.: 10/764,761

(22) Filed: Jan. 26, 2004

(65) Prior Publication Data

US 2005/0161350 A1 Jul. 28, 2005

(51) Int. Cl.
*B65D 85/57* (2006.01)
*B65D 3/00* (2006.01)

(52) U.S. Cl. .................. 206/312; 229/5.84; 229/930

(58) Field of Classification Search ............. 206/308.1, 206/309–313; 40/124.01, 124.09, 124.11; 229/92.8, 930, 931, 5.81, 5.83, 5.84
See application file for complete search history.

(56) References Cited

U.S. PATENT DOCUMENTS

| | | | | |
|---|---|---|---|---|
| 1,926,571 A | * | 9/1933 | Weindel, Jr. ............. 40/124.11 |
| 1,973,930 A | * | 9/1934 | Rammer ..................... 229/930 |
| 2,634,046 A | * | 4/1953 | Weber ........................ 229/931 |
| 3,232,423 A | | 2/1966 | Smiler |
| 3,301,467 A | | 1/1967 | Shore |
| 3,426,960 A | | 2/1969 | Shore |
| 3,556,391 A | * | 1/1971 | Kosterka .................... 206/311 |
| 4,559,259 A | * | 12/1985 | Cetrelli ....................... 229/930 |
| 4,694,954 A | * | 9/1987 | Moss .......................... 229/931 |
| 4,709,812 A | | 12/1987 | Kosterka |
| 4,740,163 A | | 4/1988 | Kuchenbecker |
| 5,001,325 A | | 3/1991 | Huizinga |
| 5,088,599 A | | 2/1992 | Mahler |
| 5,188,229 A | * | 2/1993 | Bernstein ................. 206/308.1 |
| 5,207,717 A | | 5/1993 | Manning |
| 5,284,242 A | | 2/1994 | Roth et al. |
| 5,427,309 A | * | 6/1995 | Voss ........................... 229/931 |
| 5,462,158 A | | 10/1995 | Kramer |
| 5,595,293 A | | 1/1997 | Miller |
| 5,697,496 A | | 12/1997 | Bauer |
| 5,772,018 A | | 6/1998 | Walch |
| 6,168,015 B1 | | 1/2001 | Shimizu |
| 6,761,307 B2 | * | 7/2004 | Matsuoka ................... 229/930 |

* cited by examiner

*Primary Examiner*—Luan K Bui
(74) *Attorney, Agent, or Firm*—Amster, Rothstein & Ebenstein LLP

(57) ABSTRACT

A package for storage of at least one recording medium has a paperboard component formed from a blank folded along a horizontal midline to define a double thickness, with an exposed outer face thereof being coated and printed and a concealed inner face thereof being unprinted. The concealed inner face defines at least one pair of parallel grooves, preferable formed by laser ablation.

21 Claims, 8 Drawing Sheets

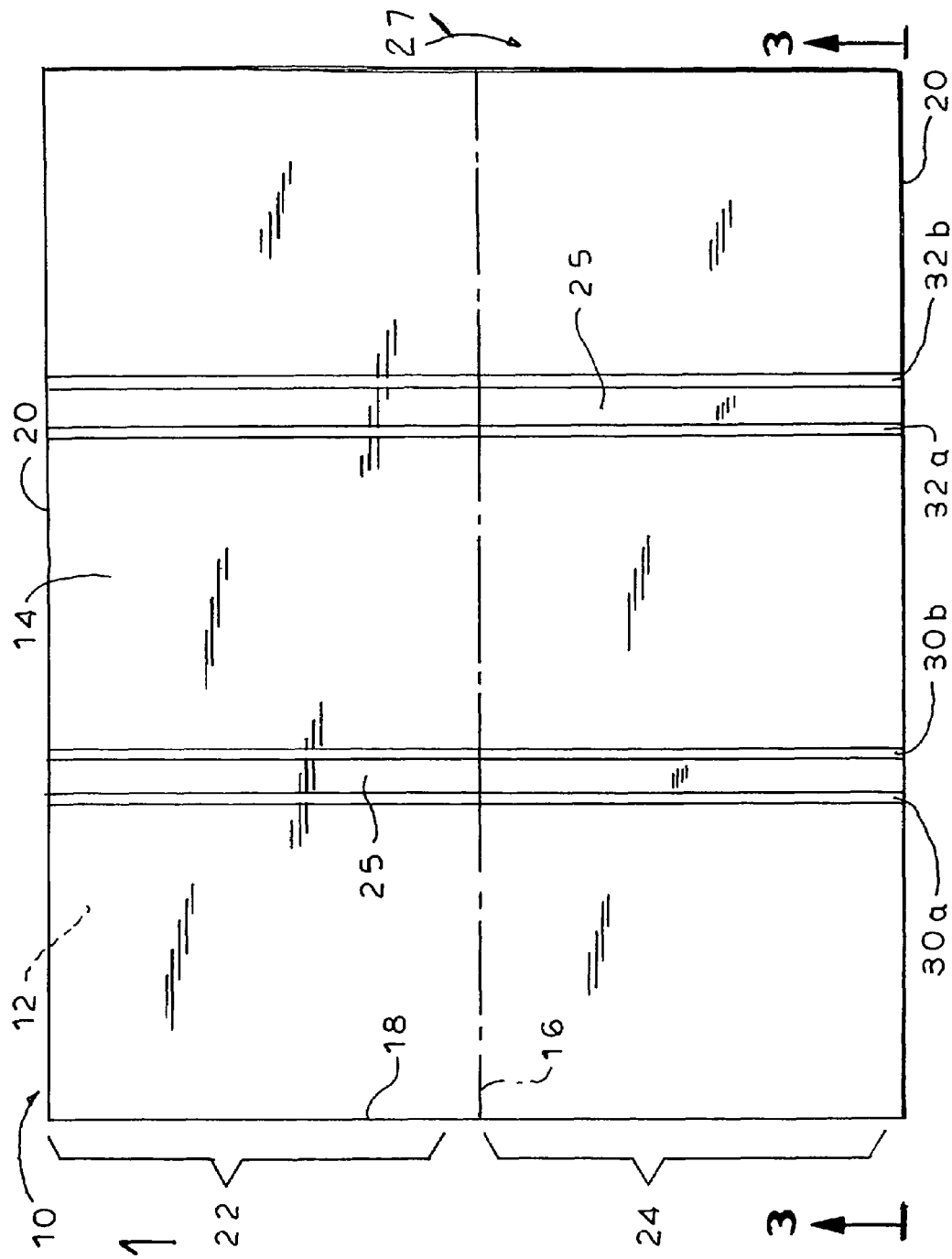

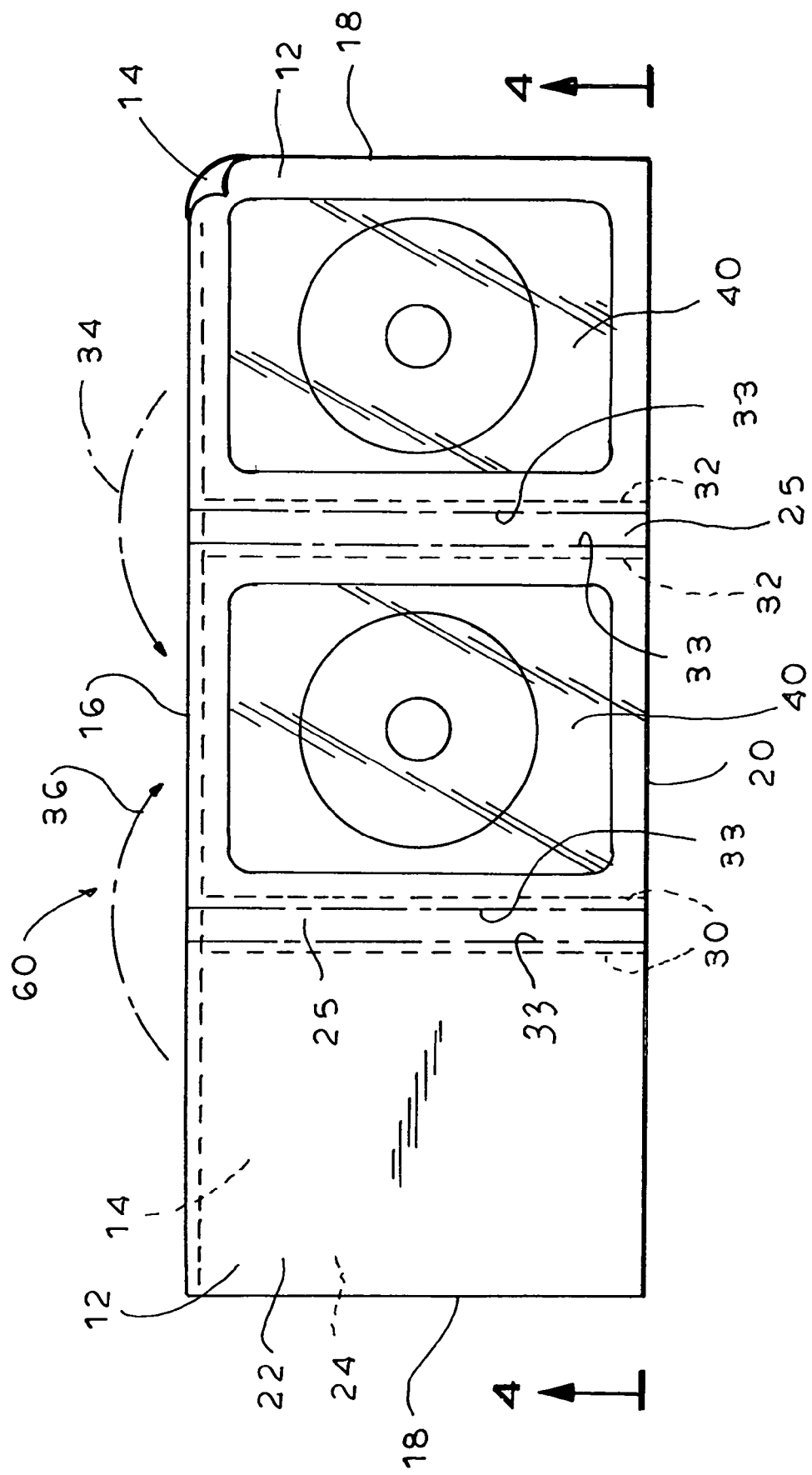

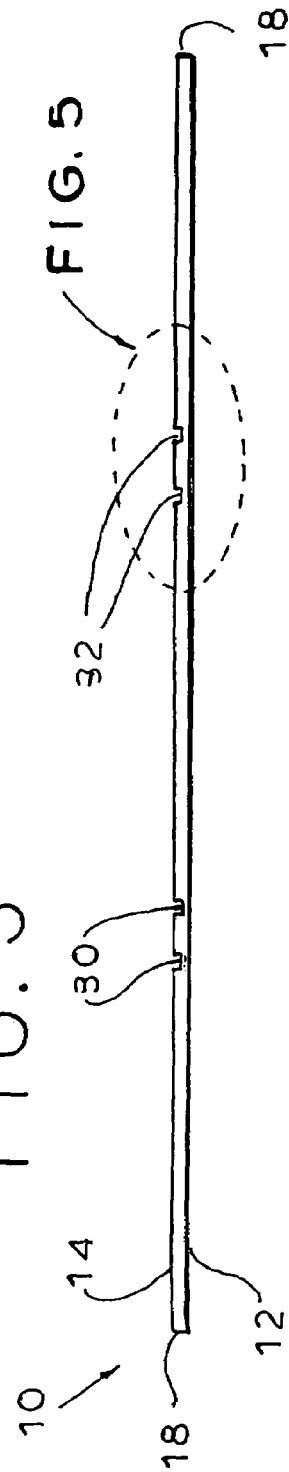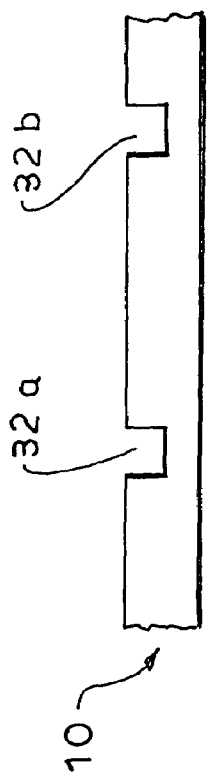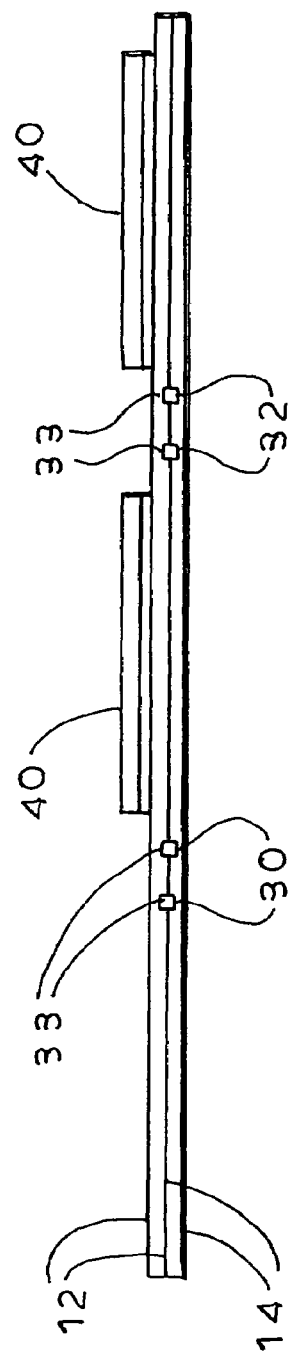

GROOVED BOARD PACKAGING AND BLANK THEREFOR

BACKGROUND OF THE INVENTION

The present invention relates to packaging for a recording media and a blank therefor, and more particularly to a grooved blank and packaging made therefrom.

Kosterka U.S. Pat. No. 4,709,812 discloses a package for a compact disc formed from a precut, prescored, preprinted unitary blank or sheet and at least one injection molded plastic compact disc holder. More particularly, the blank is divided into two rows of a like plurality of rectangular sections, the rows being separated by a foldline. The sections in the first or bottom row are separated from each other by a strip having a width small relative to the width of the sections, the strips being bound by foldlines, and the sections in the second or top row are separated from each other by a slot having a width slightly greater than the width of the strip. The second row is eventually folded downwardly along the foldline so that each of the sections of the second row partially overlie a respective section of the first row but does not overlie the strip adjacent that section of the first row. The overlying sections are joined together to form double thickness segments. While this package has received widespread acceptance, it has not proved to be entirely satisfactory for high quality packaging.

If only one face of the blank is to be printed, only one passage is required through the printing press (whereas if both faces are to be printed, two passes through the printing press are required). The use of single paths through the printing press allows faster turnaround, increased capacities, lower costs and the like. Further, where the blank is to be printed on only one side, higher quality graphics may be utilized as there is no fear of ink bleeding through from an image on one face to an image on the opposite face.

In Kosterka, while the segments are of double blank (board) thickness, the strips are of single blank thickness. When, for economic or other reasons, the blank is coated and printed on only one face thereof, the segments (formed from two folded-over sections) can be made with both outer surfaces thereof (i.e., the front and back of each segment) appropriately coated and printed. However, the strips intermediate the segments, being made of single board thickness, can have only one face thereof coated and printed (typically the face thereof which will be visible in the folded package), with the other face (typically the face thereof which is visible only when the package is opened) being unprinted. Because the unprinted face of the strip is visible to the viewer once the package is opened, the package appears less attractive and less finished to the viewer.

Further, because the strips of the Kosterka package are of only single board thickness, they are more subjected to becoming torn than the segments which are formed from double board thickness.

Accordingly, it is an object of the present invention to provide a package for a recording media which in a preferred embodiment is made from a paperboard blank which is coated and printed on only one side thereof, all exposed faces of the package, even when opened, being coated and printed.

Another object of the present invention is to provide such a package wherein in a preferred embodiment the segments are interconnected by double board thickness strips for additional strength.

A further object of the present invention is to provide a blank from which such packaging may be made.

It is also an object of the present invention to provide such a blank and packaging which is simple and inexpensive to manufacture and use.

SUMMARY OF THE INVENTION

It has now been found that the above and related objects of the present invention are obtained in a blank for the paperboard component of a package for storage of at least one recording medium. The blank comprises an unfolded sheet of paperboard defining a first face and a second face opposite the first face. The first face is flat, coated and printed, and the second face is unprinted, optionally uncoated, and defines at least one pair of adjacent parallel grooves. The blank is adapted to be folded into halves about a horizontal midline thereof transverse to the at least one pair of parallel grooves such that in the folded blank (i.e., the package) both the halves of the second face face one another and both the halves of the first face face away from one another, whereby the first face is exposed and the second face is concealed.

In a preferred embodiment, the grooves extend into the paperboard to a depth of at least one-half (preferably about two-thirds) of the thickness of the paperboard sheet, the grooves preferably being formed by laser. The grooves extend from the horizontal midline to parallel edges of the sheet, i.e., from one edge of the sheet through the horizontal midline to an opposite edge of the sheet. The second face preferably defines at least two spaced apart pairs of adjacent parallel grooves. The exposed first face of one of the halves is configured and dimensioned to receive thereon at least one plastic component.

The present invention also encompasses a package for storage of at least one recording medium, the package comprising a paperboard component formed of a blank. The blank is folded along a horizontal midline to define a double thickness with exposed outer faces thereof being coated and printed and concealed inner faces thereof being unprinted. The concealed inner faces define at least one pair of adjacent parallel grooves.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with accompanying drawings wherein:

FIG. 1 is a bottom plan view of a blank according to the present invention; and

FIG. 2 is a front elevational view of a six panel package according to the present invention in an open orientation, the package being made from the blank of FIG. 1;

FIG. 3 is an elevational view of the blank taken along the line 3-3 of FIG. 1;

FIG. 4 is an elevational view of the blank taken along the line 4-4 of FIG. 2;

FIG. 5 is an enlarged view of the circled area of FIG. 3;

DETAILED DESCRIPTION OF THE PREFERRED EMBODIMENTS

Figure 6:
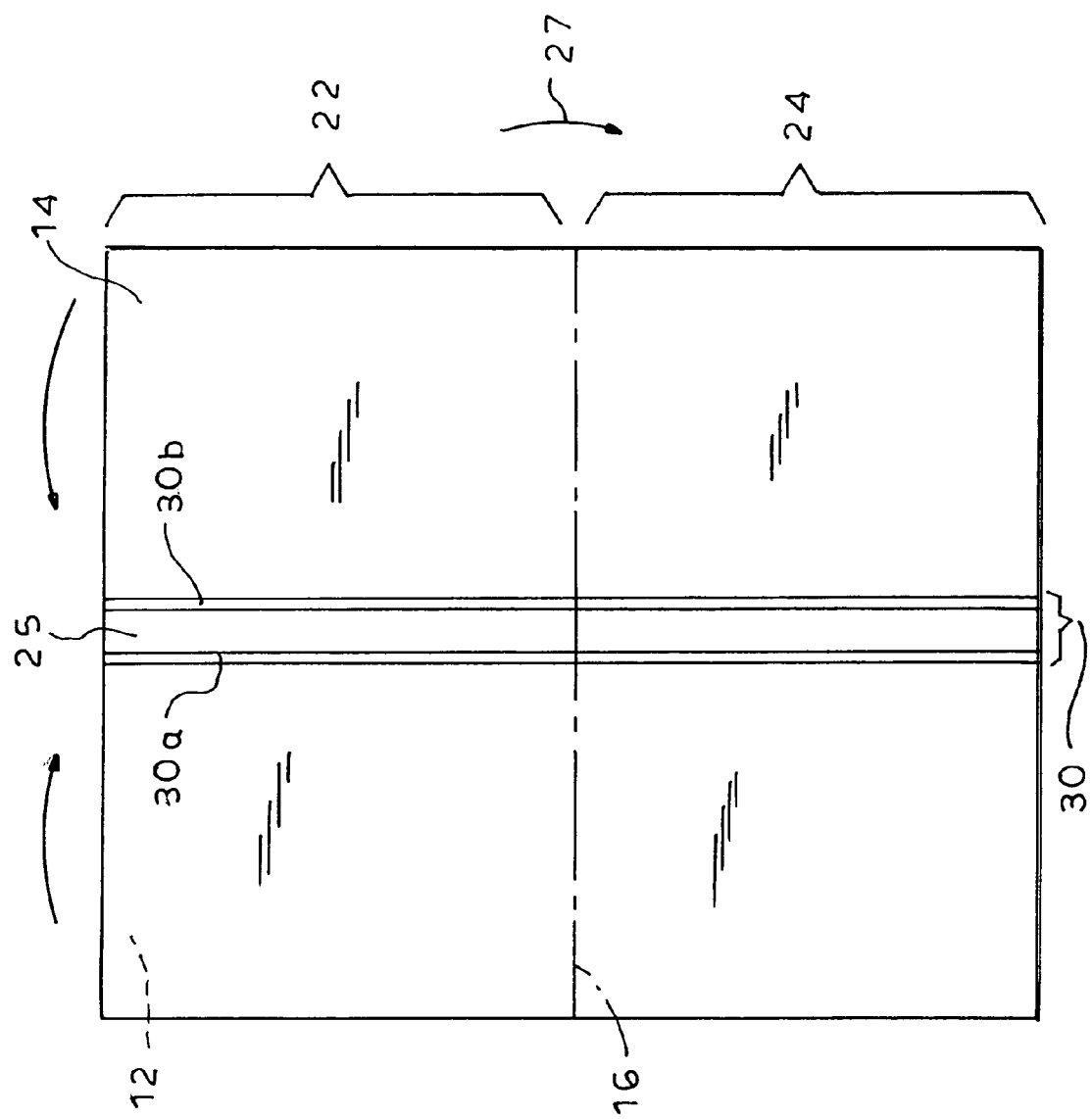
FIG. 6 is a bottom plan view of a blank for a four panel package.

Referring now to the drawing, and in particular to FIG. 1 thereof, therein illustrated is a blank according to the present invention, generally designated by the reference numeral 10. The blank 10 is used to form the paperboard component of a package for storage of at least one recording medium and comprises an unfolded sheet of paperboard defining a first face 12 and a second face 14 opposite the first face 12. The first face 12 is flat, coated and printed; in contrast thereto, the second face 14 is unprinted and optionally uncoated. Accordingly, relative to the first face 12, the second face 14 presents, to the extent visible, a somewhat unfinished appearance. The term "coated" as used herein and in the claims refers to a board surface having a calendered clay coating or the like thereon to prepare it for printing.

A horizontal foldline 16 extends between the lateral ends 18 of the blank 10 midway between the top and bottom edges 20 of the blank 10. The blank 10 is adapted to be folded into halves 22, 24 about the horizontal midline 16 with the top half 22 overlapping the bottom half 24 (see arrow 27 of FIG. 1) so that the first face 12 of the two halves 22, 24 face away from one another and the second face 14 thereof face one another. Thus, when the blank 10 is appropriately folded about midline 16, only the 0first face 12 is exposed, and the second face 14 is concealed.

The folded blank 10 is provided with at least one pair of parallel foldlines 33 extending transversely between top and bottom edges 20, thereby to divide the folded blank 10 into a plurality of segments with strips 25 therebetween, the segments being foldable over one another to form a package having only the first face 12 exposed. However, the resulting product is not entirely satisfactory. Whether the transverse pairs of foldlines 33 are imposed prior to the folding of the blank halves 22, 24 one upon the other, or after the blank 10 has been so folded, the opening and closing of the package imposes stresses which result in strains on the portion of the overlapping strip(s) 25, disposed between each pair of the parallel transverse foldlines 33, such that the coated and printed face 12 of the strip(s) 25 become distorted and deformed, thereby giving the package, when opened, an unfinished and messy appearance.

To overcome this problem, the present invention teaches the formation of at least one pair of adjacent parallel grooves 30a, 30b or 32a, 32b on the second face 14 of blank 10 prior to any folding thereof. The grooves 30a, 30b, 32a, 32b formed on the second face 14 of the blank 10 are eventually complemented by aligned transverse foldlines 33 formed on the first face 12, as best seen in FIG. 2. Each pair of adjacent parallel grooves 30, 32 defines a strip 25 between the pair of adjacent parallel grooves 30, 32 (and complementary transverse foldlines 33). The grooves 30, 32 extend into the paperboard blank 10 to a depth of at least one-half of the thickness of the paperboard sheet (preferably about two-thirds of the thickness). The grooves 30, 32 extend from one edge 20 of the blank 10 through the horizontal midline 16 to the opposite edge 20 of the blank 10; thus, in the folded blank 10, the grooves 30, 32 extend from the horizontal midline 16 on top to both parallel edges 20 at the bottom.

Formation of the grooves 30, 32, by removal of paperboard material from the second face 14 of the unfolded blank 10, may be achieved by a variety of different methods. A thermal or mechanical routing technique—for example, by a laser, knife or grinder—is preferred, with a laser being especially preferred for the speed, accuracy and cleanliness of the grooves 30, 32 formed by laser ablation. It will be appreciated by those skilled in the art that the laser may be maintained stationary, and the blank 10 moved relative thereto, or the laser itself (or at least its beam) may be advanced over the blank 10 (whether the blank 10 be stationary or also moving) using appropriate scanners and/or mirrors, as disclosed in U.S. Pat. Nos. 5,001,325 and 4,740,163.

By way of example, where the paperboard blank is 0.018 inch thick, preferably a thickness of 0.012 inch is removed, thereby to leave the remaining paperboard with a thickness of 0.006 inch. Thus, the present invention enable the folded blank 10 according to the present invention to have a thickness of 0.036 inch for the segments, but a thickness of only 0.12 inch for the grooved transverse foldlines 33 defining the strips 25.

The transverse foldlines 33 are preferably formed in the grooved blank after folding thereof about the horizontal midline 16 by conventional techniques well known in the packaging art, with special care being taken to align the foldlines 33 with the grooves 30, 32.

Referring now to FIGS. 2 and 4 in particular, a plastic component 40, such as an injection molded plastic compact disk holder of conventional design, is secured (e.g., by adhesive) on the exposed outer face 12 of at least one segment of the folded blank 10. If desired, a plurality of plastic components 40 may be used on a like plurality of segments, as illustrated. Once the plastic components 40 have been added to the paperboard component, the segments may be folded along grooved transverse foldlines 33 (as illustrated by the arrows 34, 36) in turn to provide the package, generally designated 60, in the closed orientation. The grooves 30, 32 on second face 14 are concealed from view by the folded blank 10 of the package 60. Because the strips 25 are connected to the segments by grooved transverse foldlines 33 having a thickness substantially less than that of the blank 10 itself, the exposed first faces 12 of the strips 25 do not become stressed and worn, even during repeated opening and closing of the package 60, so that the package continues to present a neat, finished, high quality appearance.

Figure 7:
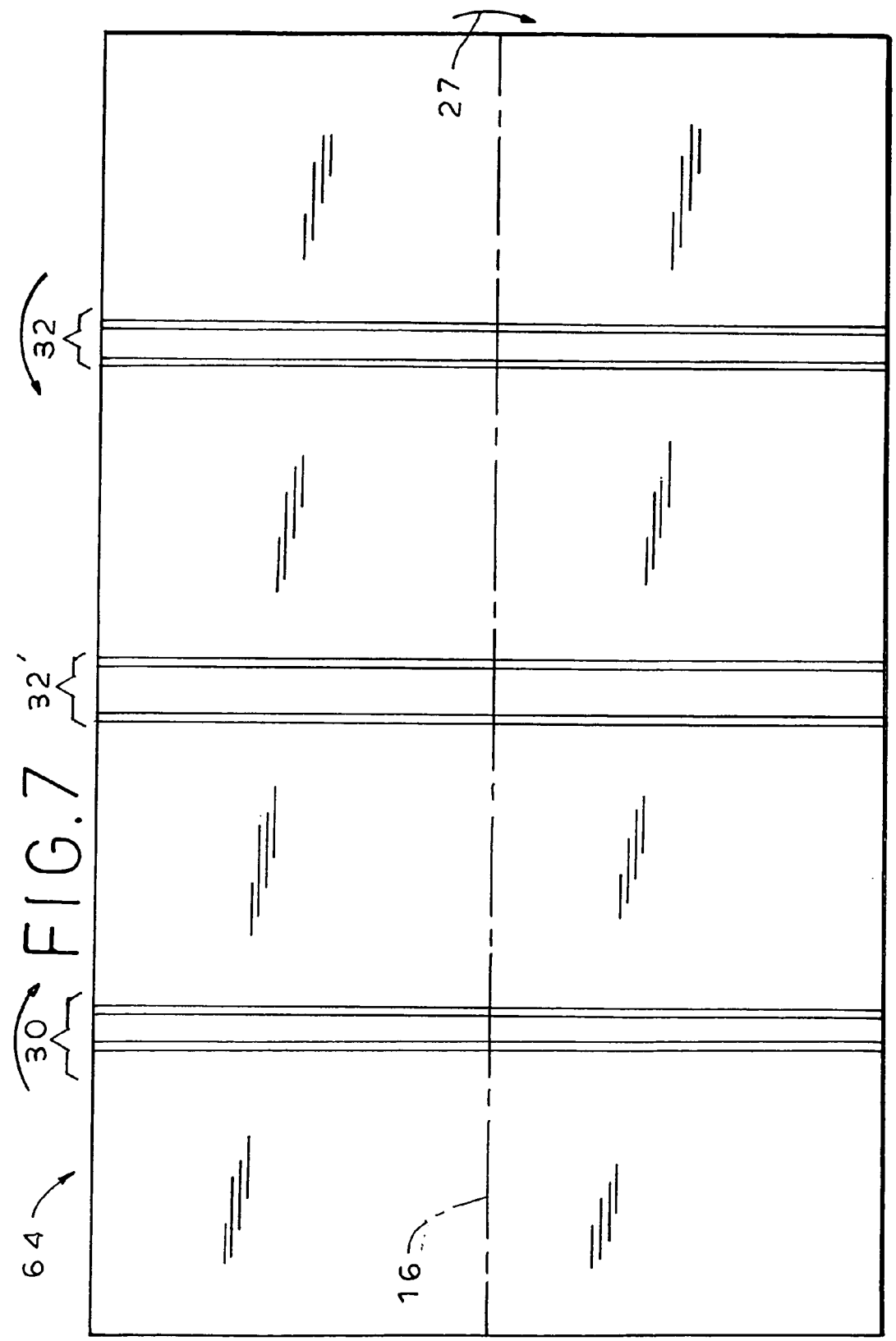
FIG. 7 is a bottom plan view of a blank for an eight panel package.

While FIGS. 2 and 4 illustrate a six panel package 60 and a blank 10 therefor, respectivey, the principles of the present invention are equally applicable to packages with a different number of panels. Thus a four panel package can be formed from the blank 62 illustrated in FIG. 6 as having only a single pair of adjacent parallel grooves 30. An eight panel package can be formed from the blank 64 illustrated in FIG. 7 as having three pairs of adjacent parallel grooves 30, 32 and 32'. The central pair of grooves 32' is preferably spaced apart by about twice the spacing apart of the outer pairs of grooves 30, 32, thereby to accommodate eight panels rather than just four panels.

Figure 8:
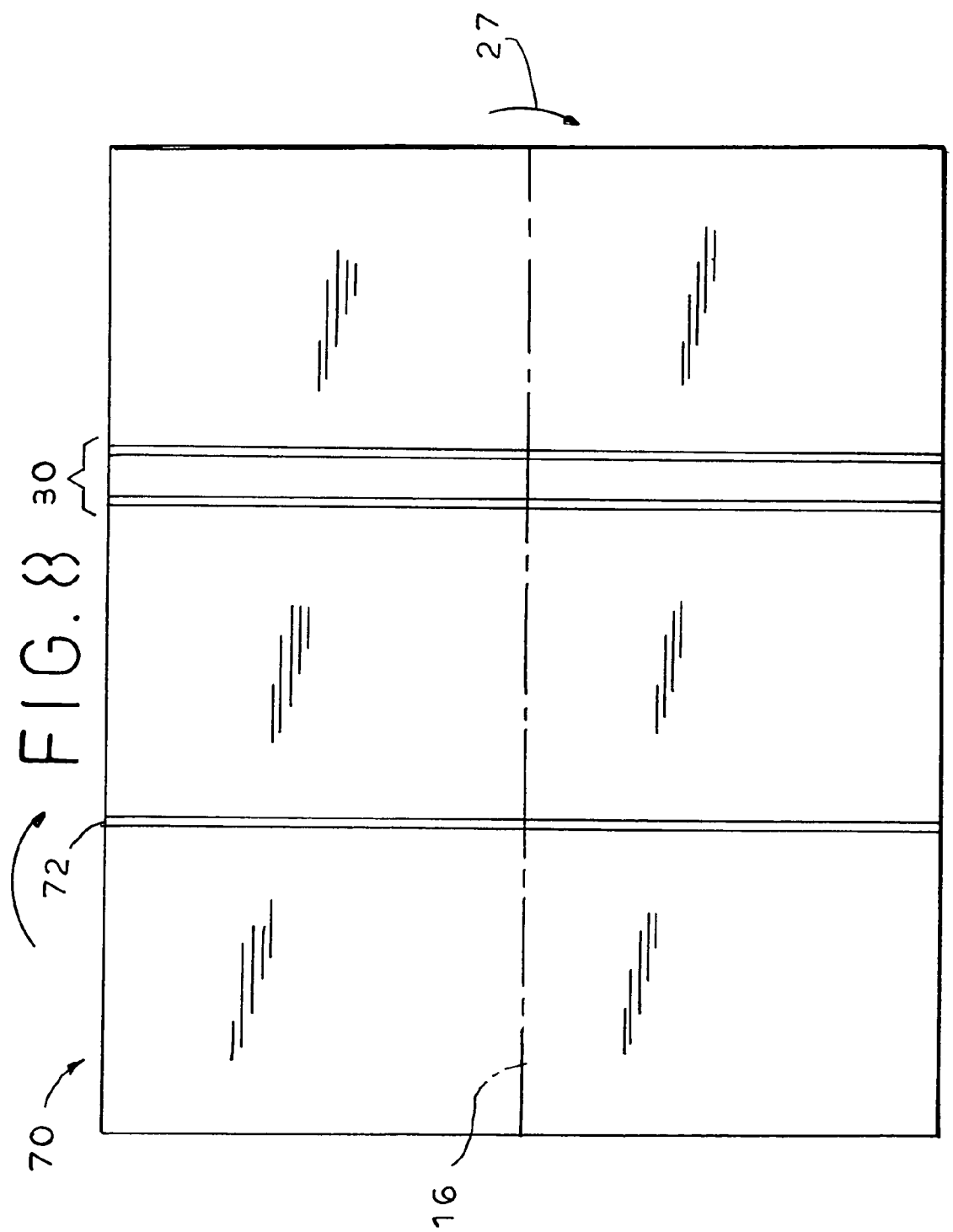
FIG. 8 is a bottom plan view of a blank for another embodiment of a six panel package according to the present invention, this embodiment including a single groove as well as a pair of adjacent parallel grooves.
Figure 9:
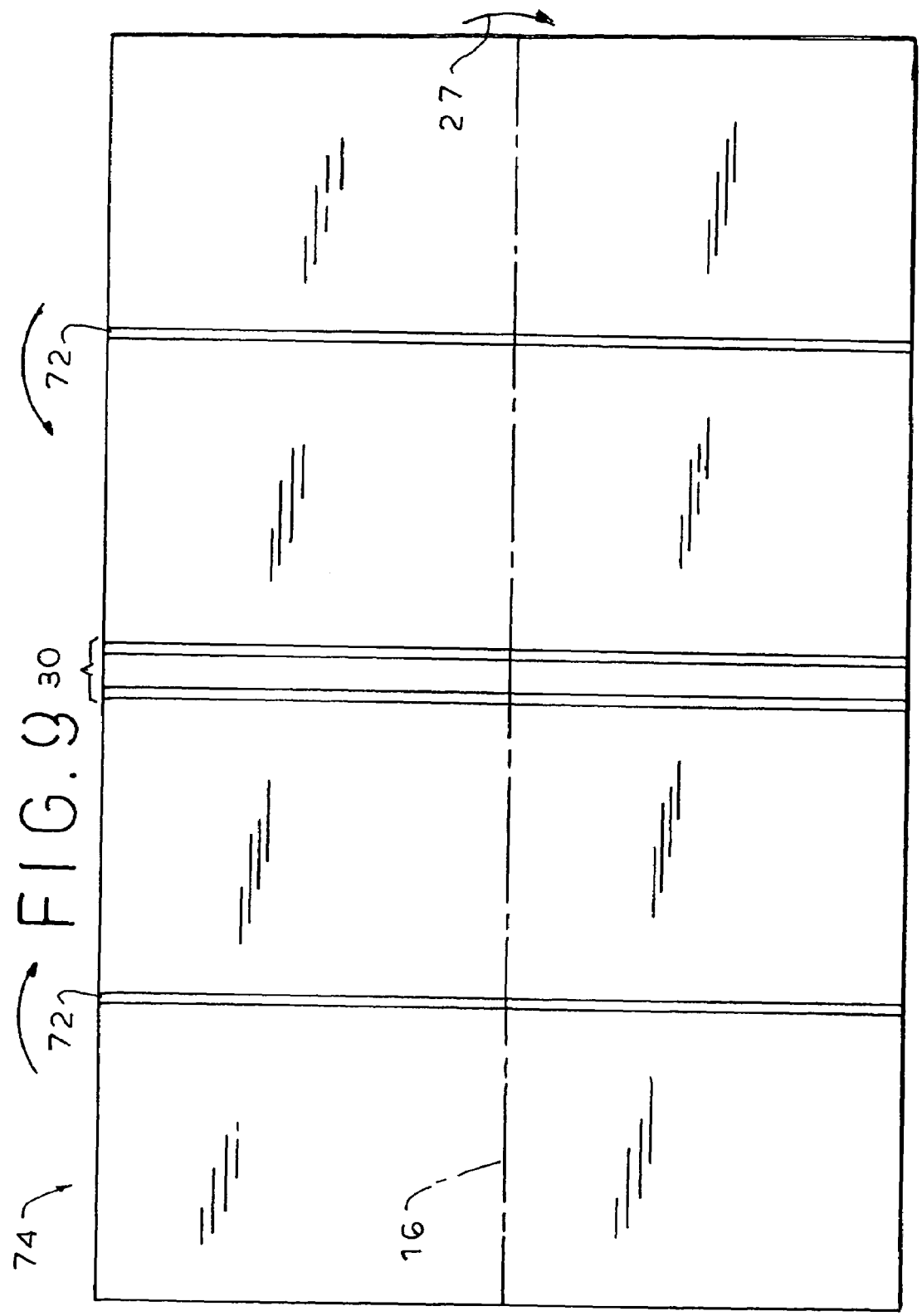
FIG. 9 is a bottom plan view of a blank for another embodiment of an eight panel package according to the present invention, this embodiment including two single grooves as well as a pair of adjacent parallel grooves.
Figure 10:
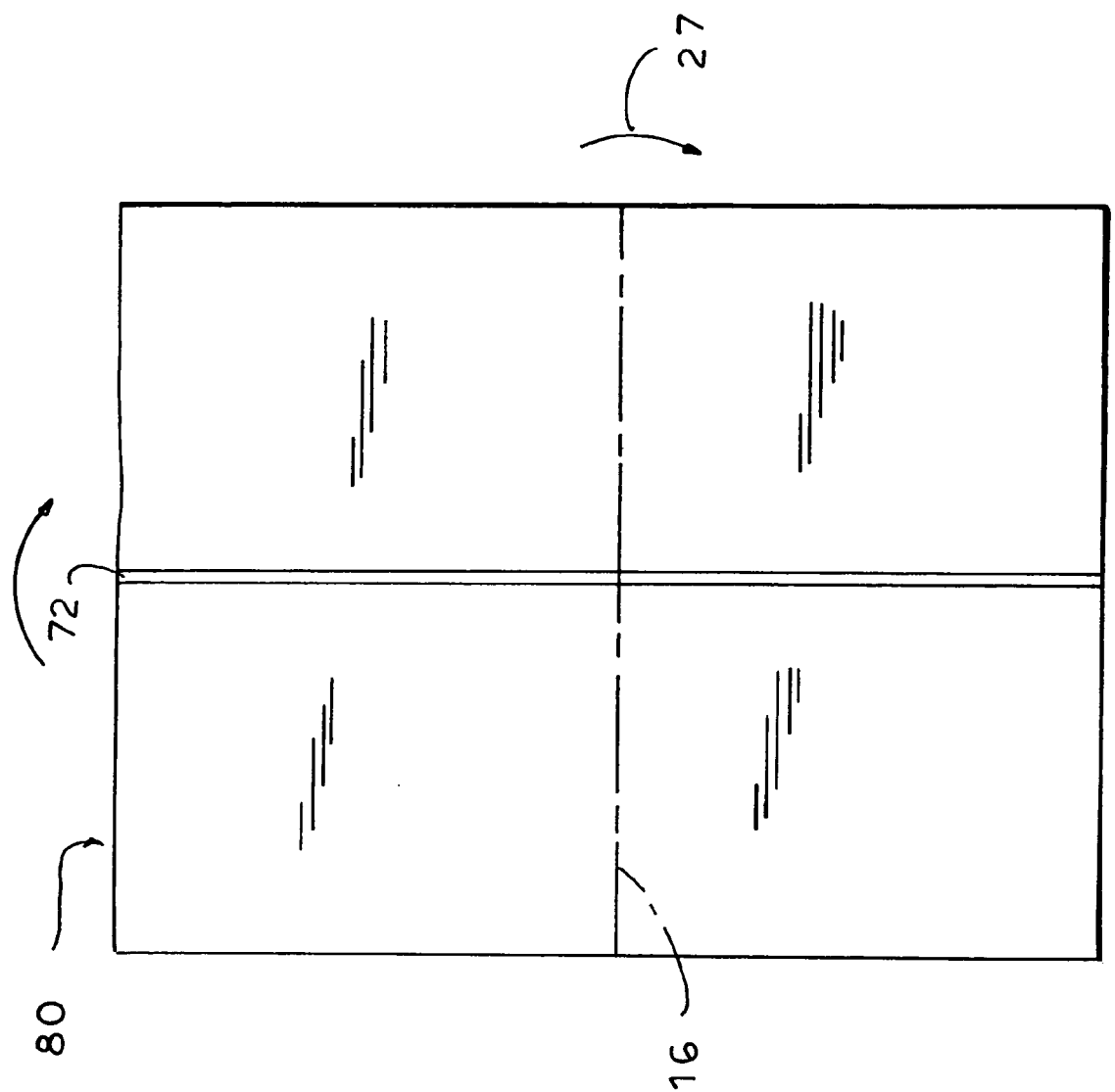
FIG. 10 is a bottom plan view of a blank for another embodiment of a four panel package according to the present invention, this embodiment including a single groove and being devoid of any pair of adjacent parallel grooves.

FIGS. 8, 9 and 10 illustrate different embodiments of a blank according to the present invention, each embodiment being characterized by the presence of at least one single groove 72. Thus, FIG. 8 illustrates a blank 70 for a six panel package including both a pair of adjacent parallel grooves 30 and a single groove 72 spaced apart from but parallel to the pair of adjacent parallel grooves 30. Similarly, FIG. 9 illustrates a blank 74 for an eight panel package including both a single pair of adjacent parallel grooves 30 and two single grooves 72, each single groove 72 being to one respective lateral side of, spaced apart from, and parallel to the pair of adjacent parallel grooves 30. After folding about the transverse midline, the two outer segments on each side of the pair of adjacent parallel grooves 30 are folded over the adjacent inner segment, along the single groove 72. Then the two double sections are brought together such that the original two outer segments are in contact. To accommodate the extra panels of both double segments, the pair of adjacent parallel grooves 30 are more widely spaced apart than usual.

Depending upon how a blank is intended to be folded to form the package, clearly the spacing between a pair of adjacent parallel grooves 30, 32 will be selected to accommodate the necessary number of panels.

Referring now to FIG. 10, therein illustrated is a blank 80 for a four panel package having only a single groove 72 and being devoid of any pair of adjacent parallel grooves.

It will be appreciated by those skilled in the art that generally the blank embodiments 70, 74 and 80 illustrated in FIGS. 8, 9 and 10, respectively, would be of particular utility where the package made therefrom has either very thin plastic components 40 or the plastic components 40 are reduced to mere rosettes (or, even more simply, a generally cylindrical piece of foam affixed at one end to a panel and leaving the free end to snugly grasp a surface defining the central aperture of the recording medium.

To summarize, the present invention provides a package for recording media which is made from a paperboard blank coated and printed on one side thereof, all exposed faces of the package, even when opened, being coated and printed. Further, the segments are interconnected by double board thickness strips for additional strength. The present invention additionally provides a blank from which this packaging may be made, the blank and packaging being simple and inexpensive to manufacture and use.

Now that the preferred embodiments of the present invention have been shown and described in detail, various modifications and improvements thereon will become readily apparent to those skilled in the art. Accordingly, the spirt and scope of the present invention is to be construed broadly and limited only by the appended claims, and not by the foregoing specification.

I claim:

1. A blank for the paperboard component of a package for storage of at least one recording medium, said blank comprising:
    an unfolded sheet of paperboard defining a first face and a second face opposite said first face;
    said first face being flat, coated and printed, and
    said second face being unprinted and defining at least one pair of adjacent parallel cut-out grooves;
    said blank comprising a foldline extending along a horizontal midline thereof transverse to said at least one pair of parallel grooves such that in the package both halves of said second face face one another and both halves of said first face face away from one another and each of said grooves are folded over itself about said foldline, whereby said first face is exposed and said second face is concealed, said grooves extending from said horizontal midline to parallel edges of said sheet.

2. The blank of claim 1 wherein said grooves extend into said sheet to a depth of at least one-half of the thickness of said sheet.

3. The blank of claim 1 wherein said grooves are formed by laser.

4. The blank of claim 1 wherein said second face defines at least two spaced apart pairs of parallel grooves.

5. The blank of claim 1 wherein said grooves extend from one edge of said sheet through said horizontal midline to an opposite edge of said sheet and to a depth of about two-thirds of the thickness of said sheet.

6. The blank of claim 1 wherein said second face defines three spaced apart pairs of adjacent parallel grooves.

7. The blank of claim 1 wherein said second face additionally defines at least one single groove spaced apart from and parallel to said at least one pair of adjacent parallel cut-out grooves.

8. The blank of claim 1 wherein said second face additionally defines two single grooves, each single groove being disposed to one respective lateral side of, spaced apart from, and parallel to one of said at least one pair of adjacent parallel cut-out grooves.

9. A package for storage of at least one recording medium, said package comprising:
    a paperboard component formed of a blank folded along a horizontal midline to define a double thickness with an exposed outer face thereof being coated and printed and a concealed inner face thereof being unprinted, said concealed inner face defining at least one pair of adjacent parallel cut-out grooves, each of said grooves extending from said horizontal midline to parallel edges of said sheet and folded over itself about said foldline.

10. The package of claim 9 wherein said grooves extends into said blank to a depth of at least one-half of the thickness of said blank.

11. The package of claim 9 wherein said grooves are formed by laser.

12. The package of claim 9 wherein said inner face defines at least two spaced apart pairs of parallel cut-out grooves.

13. The package of claim 9 wherein said grooves extend from one edge of said blank through said horizontal midline to an opposite edge of said blank and to a depth of about two-thirds of the thickness of said blank.

14. The package of claim 9 additionally including on said exposed outer face at least one plastic component adapted to receive a recording medium.

15. The package of claim 9 wherein said inner face defines three spaced apart pairs of adjacent parallel cut-out grooves.

16. The package of claim 9 wherein said inner face additionally defines at least one single groove spaced apart from and parallel to said at least one pair of adjacent parallel cut-out grooves.

17. The package of claim 9 wherein said inner face additionally defines two single grooves, each single groove being disposed to one respective lateral side of, spaced apart from, and parallel to one of said at least one pair of adjacent parallel cut-out grooves.

18. A package for storage of at least one recording medium, said package comprising:
    a paperboard component formed of a blank folded along a horizontal midline to define a double thickness with an exposed outer face thereof being coated and printed and a concealed inner face thereof being unprinted, said concealed inner face defining at least one pair of adjacent parallel grooves; said grooves extending into said blank to a depth of at least one-half of the thickness of said blank and being formed by laser; said grooves extending from said horizontal midline to parallel edges of said folded blank; and on said exposed outer face, at least one plastic component adapted to receive a recording medium.

19. The package of claim 18 wherein said concealed inner face is uncoated.

20. A blank for the paperboard component of a package for storage of at least one recording medium, said blank comprising:

an unfolded sheet of paperboard defining a first face and a second face opposite said first face;

said first face being flat, coated and printed, and said second face being unprinted and defining at least one cut-out groove;

said blank comprising a foldline extending along a horizontal midline thereof transverse to said at least one groove such that in the package both halves of said second face face one another and both halves of said first face face away from one another, whereby said first face is exposed and said second face is concealed and said at least one cut-out groove extends from said horizontal midline to parallel edges of said sheet and is folded over itself about said foldline.

21. A package for storage of at least one recording medium, said package comprising:

a paperboard component formed of a blank folded along a horizontal midline to define a double thickness with an exposed outer face thereof being coated and printed and a concealed inner face thereof being unprinted, said concealed inner face defining at least one cut-out groove, said groove extending from said horizontal midline to parallel edges of said blank and folded over itself about said horizontal midline.

* * * * *